(12) United States Patent
Ramachandran et al.

(10) Patent No.: US 11,431,526 B2
(45) Date of Patent: Aug. 30, 2022

(54) DETERMINISTIC FORWARDING ACROSS L2 AND L3 NETWORKS

(71) Applicant: Cisco Technology, Inc., San Jose, CA (US)

(72) Inventors: Rekha Ramachandran, Bangalore (IN); Pascal Thubert, Roquefort les Pins (FR)

(73) Assignee: Cisco Technology, Inc., San Jose, CA (US)

( * ) Notice: Subject to any disclaimer, the term of this patent is extended or adjusted under 35 U.S.C. 154(b) by 39 days.

(21) Appl. No.: 17/146,734

(22) Filed: Jan. 12, 2021

(65) Prior Publication Data

US 2021/0135902 A1    May 6, 2021

Related U.S. Application Data

(63) Continuation of application No. 16/105,421, filed on Aug. 20, 2018, now Pat. No. 10,911,262.

(30) Foreign Application Priority Data

Oct. 31, 2017    (IN) .............................. 201741038642

(51) Int. Cl.
*H04L 12/46* (2006.01)
*H04L 45/50* (2022.01)
(Continued)

(52) U.S. Cl.
CPC ...... *H04L 12/4633* (2013.01); *H04L 12/4641* (2013.01); *H04L 45/50* (2013.01);
(Continued)

(58) Field of Classification Search
None
See application file for complete search history.

(56) References Cited

U.S. PATENT DOCUMENTS 7,319,699 B1    1/2008   Provine
7,860,104 B1   12/2010   Aggarwal
(Continued)

OTHER PUBLICATIONS

Mahalingam, et al., "Virtual eXtensible Local Area Network (VXLAN): A Framework for Overlaying Virtualized layer 2 Networks Over Layer 3 Networks", Independent Submission, Request for Comments 7348, 22 pages, Aug. 2014, The IETF Trust.
(Continued)

*Primary Examiner* — Kenny S Lin
(74) *Attorney, Agent, or Firm* — Behmke Innovation Group LLC; James M. Behmke; Jonathon P. Western

(57) ABSTRACT

According to one or more embodiments of the disclosure, a first tunnel router may receive a reservation request to establish a deterministic path between a first node and a second node. The first tunnel router may determine, based on the reservation request, a destination address of the second node. The first tunnel router may identify, based on the destination address of the second node, a second tunnel router associated with the second node. The first tunnel router may encapsulate a deterministic packet sent by the first towards the second node into a tunnel packet, wherein a multicast address in a header of the tunnel packet is set to the destination address of the second node. The first tunnel router can forward the tunnel packet along the deterministic path. The multicast address in the header of the tunnel packet causes nodes to send the tunnel packet according to the deterministic path.

20 Claims, 18 Drawing Sheets

(51) Int. Cl.
*H04L 69/324* (2022.01)
*H04L 69/325* (2022.01)
*H04L 101/622* (2022.01)
*H04L 61/10* (2022.01)
*H04L 61/5084* (2022.01)

(52) U.S. Cl.
CPC .......... *H04L 61/10* (2013.01); *H04L 61/2084* (2013.01); *H04L 61/6022* (2013.01); *H04L 69/324* (2013.01); *H04L 69/325* (2013.01)

(56) References Cited

U.S. PATENT DOCUMENTS

| | | | | |
|---|---|---|---|---|
| 10,516,544 | B2* | 12/2019 | Moreno | .................. H04L 69/03 |
| 10,911,262 | B2* | 2/2021 | Ramachandran | ... H04L 12/4641 |
| 2004/0006613 | A1 | 1/2004 | Lemieux | |
| 2005/0169270 | A1 | 8/2005 | Mutou | |
| 2014/0269421 | A1 | 9/2014 | Previdi | |
| 2014/0307541 | A1* | 10/2014 | Badoni | .................. H04L 45/28 |
| | | | | 370/254 |
| 2015/0043383 | A1 | 2/2015 | Farkas | |
| 2016/0149808 | A1* | 5/2016 | Cai | ..................... H04L 12/4633 |
| | | | | 370/395.53 |
| 2017/0295093 | A1* | 10/2017 | Moreno | .................. H04L 45/16 |
| 2018/0006955 | A1 | 1/2018 | Bush | |
| 2019/0097745 | A1 | 3/2019 | Mallela | |
| 2019/0097884 | A1* | 3/2019 | Thubert | ............... H04L 43/0864 |
| 2019/0124006 | A1* | 4/2019 | Thubert | ................. H04L 47/12 |

OTHER PUBLICATIONS

Sajassi, et al., "BGP MPLS Based Ethernet VPN", Network Working Group, Internet-Draft, draft-ietf-l2vpn-evpn-11, 52 pages, Oct. 18, 2014, The IETF Trust.

* cited by examiner

DETERMINISTIC FORWARDING ACROSS L2 AND L3 NETWORKS

RELATED APPLICATION

This present application is a Continuation Application of U.S. patent application Ser. No. 16/105,421, filed Aug. 20, 2018, entitled DETERMINISTIC FORWARDING ACROSS L2 AND L3 NETWORKS, by Rekha Ramachandran et al., and claims priority to Indian Patent Application No. 201741038642, filed on Oct. 31, 2017, entitled DETERMINISTIC FORWARDING ACROSS L2 AND L3 NETWORKS by Ramachandran et al., the contents of which are incorporated by reference herein.

TECHNICAL FIELD

The present disclosure relates generally to computer networks and, more particularly, to deterministic forwarding across layer-2 (L2) and layer-3 (L3) networks.

BACKGROUND

In general, deterministic networking attempts to precisely control when a data packet arrives at its destination (e.g., within a bounded timeframe). This category of networking may be used for a myriad of applications, such as industrial automation, vehicle control systems, and other systems that require the precise delivery of control commands to a controlled device. However, implementing deterministic networking places additional requirements on a network. For example, packet delivery in a deterministic network may require the network to exhibit fixed latency, zero or near-zero jitter, and high packet delivery ratios.

As an example of a deterministic network, consider a railway system. A railway system can be seen as deterministic because trains are scheduled to leave a railway station at certain times, to traverse any number stations along a track at very precise times, and to arrive at a destination station at an expected time. From the human perspective, this is also done with virtually no jitter. Which tracks are used by the different trains may also be selected so as to prevent collisions and to avoid one train from blocking the path of another train and delaying the blocked train.

The IEEE 802.1 Time-Sensitive Networking (TSN) Task Group provides signaling to reserve a switched path with deterministic properties across a contiguous layer-2 (L2) domain. However, this does not cover overlaid networks such as those based on a virtual extensible local area network (VxLAN), which is common in cloud-based and enterprise-based networks. Additionally, the Deterministic Networking (DetNet) Working Group of the Internet Engineering Task Force (IETF) describes carrying deterministic streams over Multiprotocol Label Switching (MPLS) and PseudoWire layer-3 networks for Internet Service Protocol (ISP) type of networks. However, there is no known method for deterministic streams in cloud-based or enterprise-based networks, where VxLAN encapsulation would be useful.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a first tunnel router may receive a reservation request to establish a deterministic path between a first node and a second node. The first tunnel router may determine, based on the reservation request, a destination address of the second node. The first tunnel router may identify, based on the destination address of the second node, a second tunnel router associated with the second node. As such, the first tunnel router may encapsulate a deterministic packet sent by the first towards the second node into a tunnel packet, wherein a multicast address in a header of the tunnel packet is set to the destination address of the second node. The first tunnel router can then forward the tunnel packet along the deterministic path. The multicast address in the header of the tunnel packet causes nodes between the first tunnel router and the second tunnel router to send the tunnel packet according to the deterministic path.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE 1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1A:
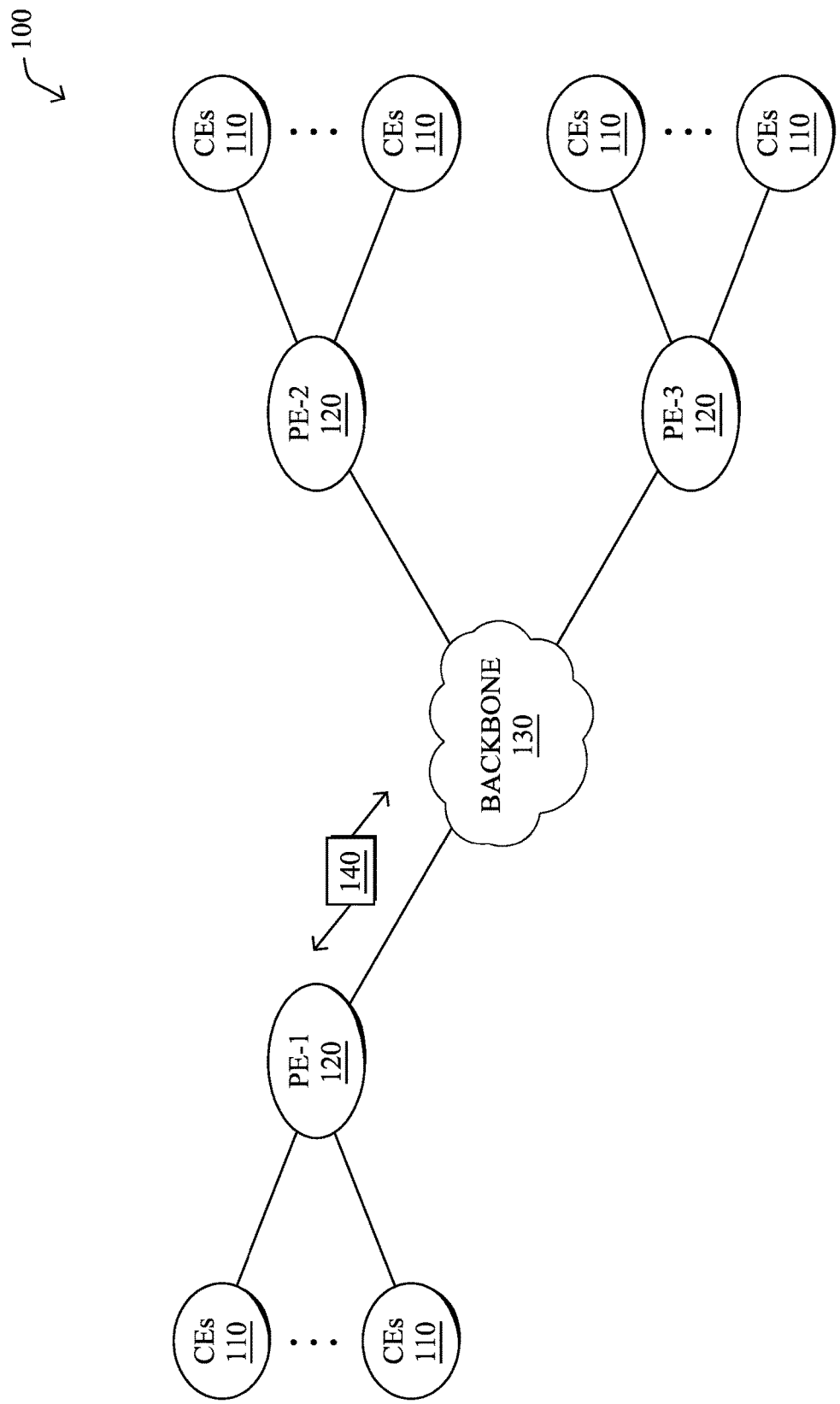
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

Figure 1B:
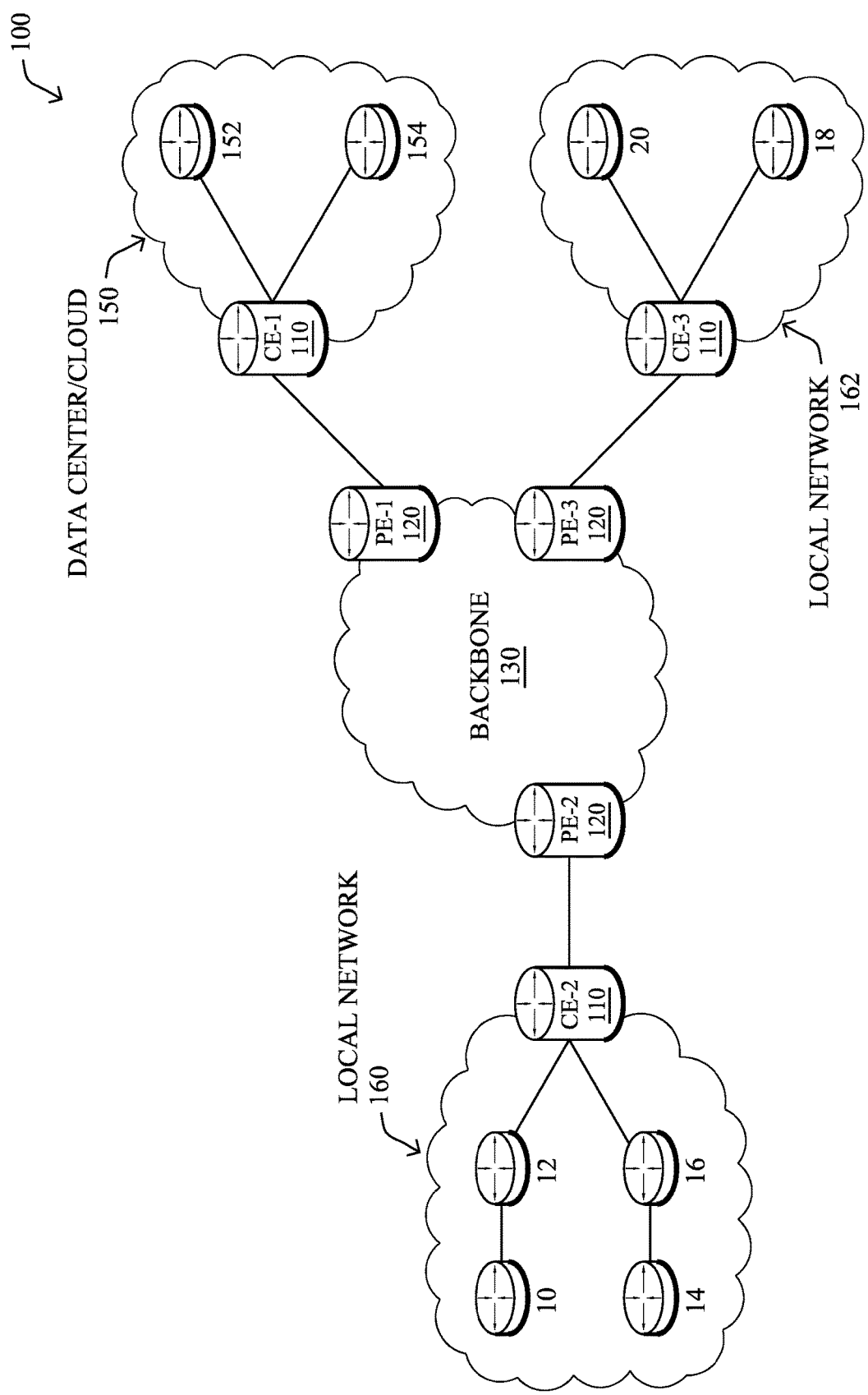

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc. Alternatively, in various embodiments, network 100 may include one or more mesh networks, such as an Internet of Things network. Loosely, the term "Internet of Things" or "IoT" refers to uniquely identifiable objects (things) and their virtual representations in a network-based architecture (e.g., the interconnection of objects (e.g., smart objects), such as sensors and actuators, over a computer network).

Figure 2:
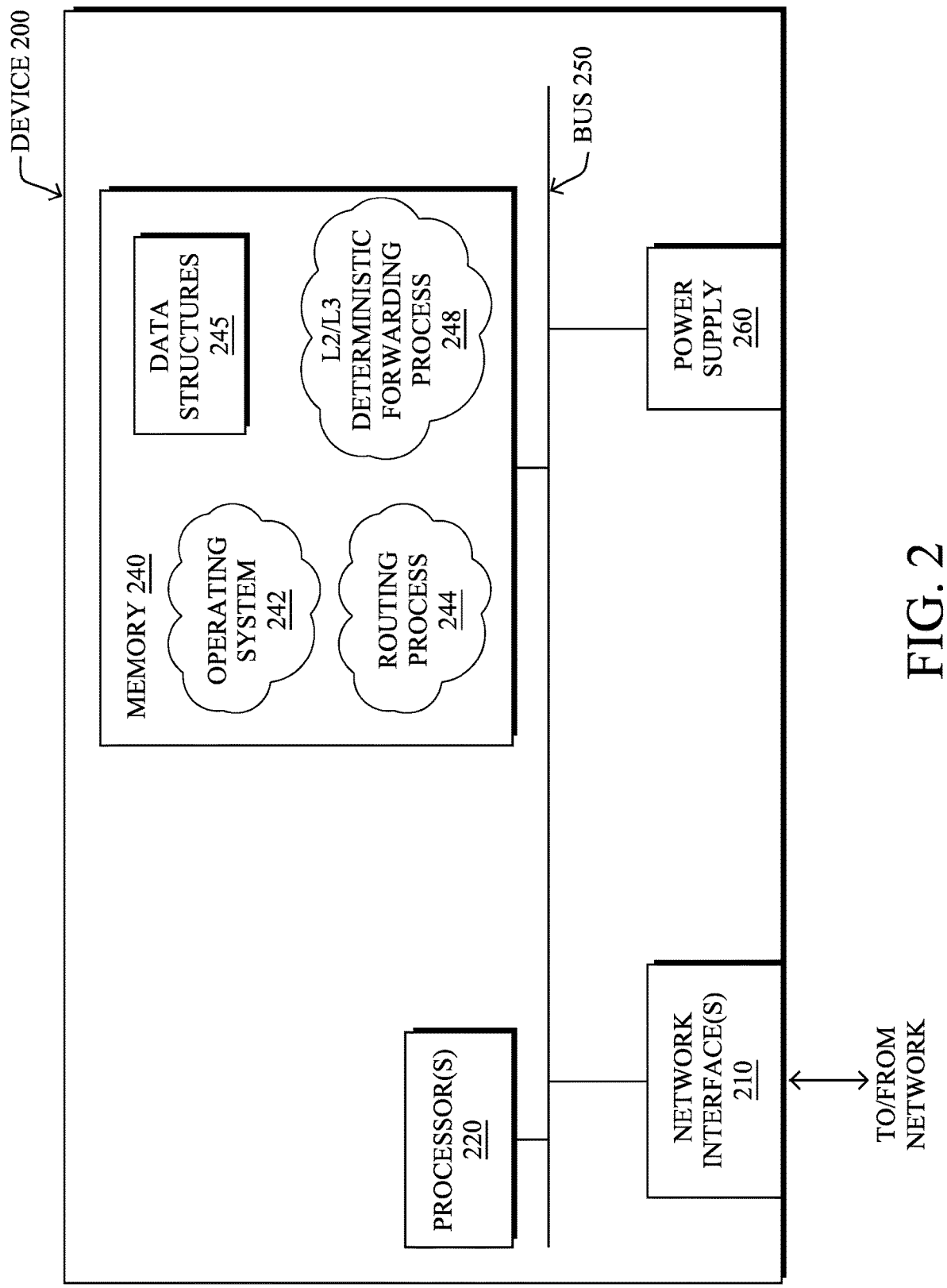
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a layer-2 or layer-3 (L2/L3) deterministic forwarding process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instances, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN"<draft-ietf-l2vpn-evpn>, introduces a solution for multipoint L2VPN services with advanced multi-homing capabilities, using BGP for distributing customer/client media access control (MAC) address reachability information over the core MPLS/IP network.

L2/L3 deterministic forwarding process 248 includes computer executable instructions that, when executed by processor(s) 220, cause device 200 to participate in the deterministic forwarding of data, data packets, etc. across L2 and L3 networks/fabric as described below. For example, the L2/L3 deterministic forwarding process 248 may operate on a tunnel router in conjunction with the L2/L3 deterministic forwarding process 248 to send and/or receive deterministic tunnel packets across L2 and L3 networkings, for example, an audio video bridging (AVB) or a Time-Sensitive Networking (TSN) domain as detailed below.

Deterministic networking techniques, in particular, have been emerging in the industry in order to transmit data (e.g., packets, frames, etc.) across a computer network in order to reach a desired recipient at (or near) a specific time. Example environments that benefit from deterministic network (such as deterministic Ethernet) include industrial engineering or other networks requiring precision control timing (e.g., controlling actuators at a precise time). Data networks, on the other hand, have conventionally been less deterministic, generally not requiring precise delivery timing.

Certain communication protocols may benefit from being more deterministic. For example, audio-video bridging (AVB) is an example of a time-sensitive networking environment, where synchronization, low-latency, and reliability are paramount to an effective AVB system. For instance, AVB requirements include synchronizing multiple streams to ensure they can be rendered correctly in time (e.g., for lip syncing), where a worst case delay, including source and destination buffering, must be low and deterministic (e.g., 2 ms-50 ms).

Figure 3:
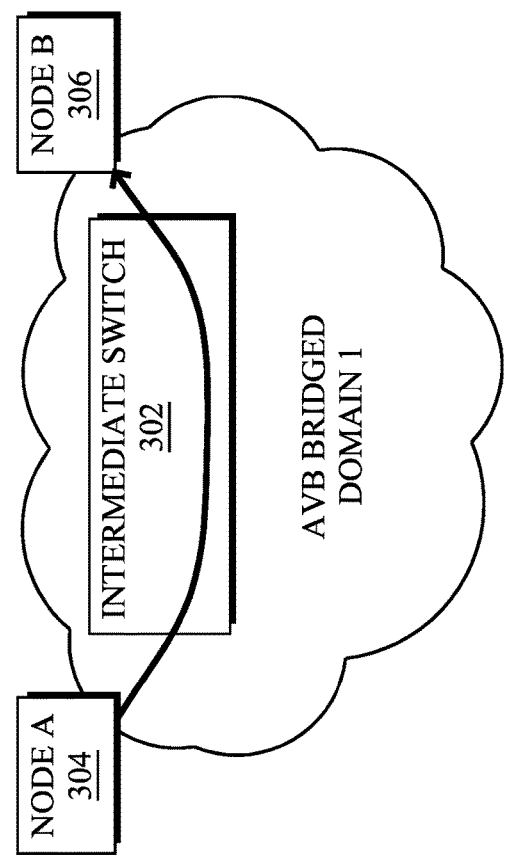
FIG. 3 illustrates example deterministic paths across layer-two (L2) switch fabric.

FIG. 3 introduces an example 300 of deterministic paths across L2 switch fabric 302 between a first node "A" 304 (e.g., a source "end node" of an AVB stream) and one or more second nodes "B" 306 (e.g., destination end node(s) of the AVB stream) as described by the IEEE 802.1 TSN Task Group for AVB or TSN domains. In order to build deterministic paths, conventional solutions for digital network architecture (DNA) networks consist of encapsulating L2 frames in virtual extensible local area network (VxLAN) frames (in IP) and routing, using a resolver (e.g., a Location Identifier Separation Protocol (LISP) mapping system), to facilitate forwarding of the encapsulated L2 frames. Additionally, other overlay techniques are also possible, for example, generic routing encapsulation (GRE). Tunnel routers, conventionally abbreviated "xTRs", serve the final nodes, encapsulate/decapsulate the VxLAN frames in order to restore the transported frames, and transparently deliver the frames to end-points (e.g., from the first node 304 to the second node 306).

AVB and other TSN domains can be connected via tunneled networks that are built using the VxLAN or the GRE tunnels. AVB is a L2 technology used for supporting professional quality media over an Ethernet network, enabling convergence of traditionally analog media networks to digital networks. This solution is defined for L2 networks. As this deployment scales in size, the need to extend AVB domains over L3 networks mostly as an overlay will arise. Resource reservation before stream transmission is a key requirement for AVB. Achieving this over L3 networks, which form the tunnel underlay, is critical for extension of AVB (or TSN) across L3.

Conventionally, a stream destination address (DA) will identify the stream in a data path. An AVB stream is identified by a multicast media access control (MAC) address or administered unicast MAC address in a network, which is placed in the frame as the destination of the stream. A virtual local area network (VLAN) is also associated with this MAC address, which will define the forwarding path in a L2 network. However, the MAC address cannot be used in a L3 network, such as used in VxLAN overlays that are becoming increasingly prevalent in cloud and enterprise applications.

To enable determinism in this model, the problem at hand is to transfer the TSN properties of the transported flow to VxLAN encapsulation or GRE encapsulation across the L2 switch fabric 302.

—Deterministic Stream Forwarding Across L2 and L3 Networks—

As noted above, switched paths with deterministic properties can be reserved across contiguous L2 domains. However, this does not cover overlaid networks such as those based on a VxLAN, which is common in cloud-based and enterprise-based networks. As noted above, AVB and other TSN domains can be connected via tunneled networks that are built using the VxLAN or the GRE tunnels. While transmitting a stream over an L3 network (e.g., via IP tunnels such as VxLAN and GRE), a method to reserve resources as well as transmit L2 encapsulated data using reserved bandwidth is required.

The techniques herein enable extending AVB or TSN domains across L3 networks using various types of tunneled networks, while ensuring stream information (even if in L2) is not lost due to encapsulation/decapsulation that is implemented for a tunnel underlay. In particular, the techniques herein describe tunnel routers (as opposed to end nodes) performing TSN or AVB reservation, where a stream destination address (DA) from a stream data packet (sent by an end node) is used as a destination MAC address in an outer tunnel frame. If a VxLAN tunnel is used, a VLAN identifier (ID) can be carried in a header of a VxLAN tunnel frame. If a GRE tunnel is used, the frame can be tagged with the VLAN ID. Doing so ensures that routers (between a sending node and a receiving node) forward the tunnel packet based on the IP, while still facilitating resource reservation matching based on the outer stream MAC.

Additionally, the techniques herein describe tunnel routers intercepting messages (e.g., reservation requests) on a control plane for AVB so that the tunnel routers can determine that deterministic streams are reachable by way of the tunnel routers. Further, the tunnel routers can be informed (e.g., by other tunnel routers or a controller) to expect to receive the deterministic streams.

Specifically, according to one or more embodiments of the disclosure as described in detail below, a first tunnel router may receive a reservation request to establish a deterministic path between a first node and a second node. The first tunnel router may determine, based on the reservation request, a destination address of the second node. The first tunnel router may identify, based on the destination address of the second node, a second tunnel router associated with the second node. As such, the first tunnel router may encapsulate a deterministic packet sent by the first towards the second node into a tunnel packet, wherein a multicast address in a header of the tunnel packet is set to the destination address of the second node. The first tunnel router can then forward the tunnel packet along the deterministic path. The multicast address in the header of the tunnel packet causes nodes between the first tunnel router and the second tunnel router to send the tunnel packet according to the deterministic path.

Illustratively, the techniques described herein may be performed by hardware, software, and/or firmware, such as in accordance with the illustrative "L2/L3 deterministic forwarding" process 248, which may include computer executable instructions executed by the processor 220 to perform functions relating to the techniques described herein, for example, in conjunction with one or more other processes and across one or more devices (e.g., servers, switches, etc.).

Figure 4:
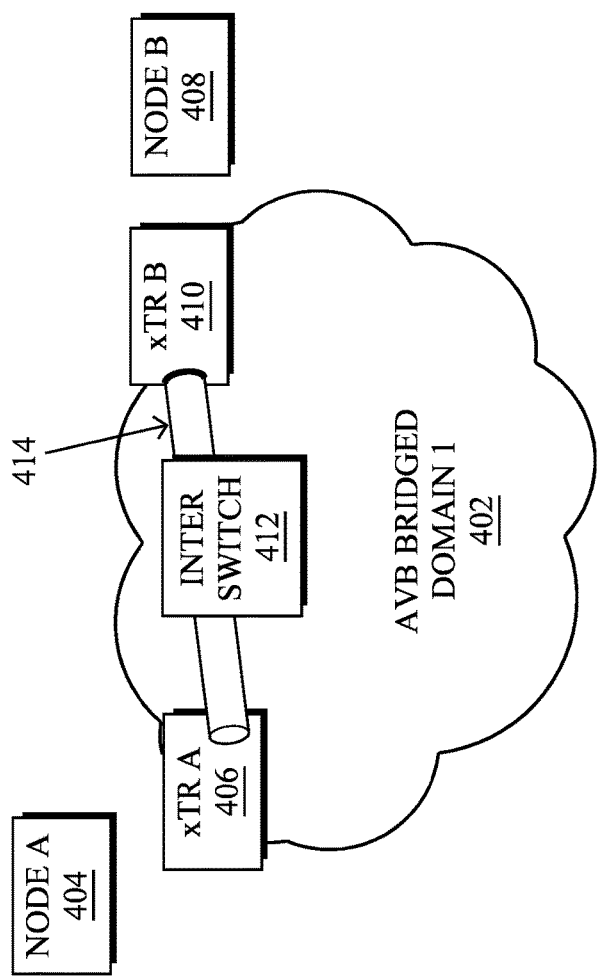
FIG. 4 illustrates an example audio video bridging (AVB) (or Time-Sensitive Networking (TSN)) bridged domain that possesses L2 continuity with AVB (or TSN) capabilities throughout.

Operationally, the techniques herein generally are based on signaling, by tunnel routers, to reserve switched paths with deterministic properties across L3 networks. In particular, the techniques here describe connecting AVB or TSN domains via tunneled networks using VxLAN or GRE tunnels. First, and with reference to example 400 of FIG. 4, the techniques herein comprise an AVB (or TSN) bridged domain 402. The AVB (or TSN) bridged domain 402 possesses L2 continuity with AVB (or TSN) capabilities throughout. The AVB bridged domain 402 comprises a first node 404 ("A"), a first tunnel router (xTR) 406 ("xTR A") associated with the first node 404, a second node 408 ("B"), a second tunnel router 410 ("xTR B") associated with the second node 408, and intermediate switches (e.g., nodes) 412 in connection between the first tunnel router 406 and the second tunnel router 410. Further, a tunnel 414 can be formed between the first tunnel router 406 and the second tunnel router 410 over the intermediate switches 412.

Figure 5:
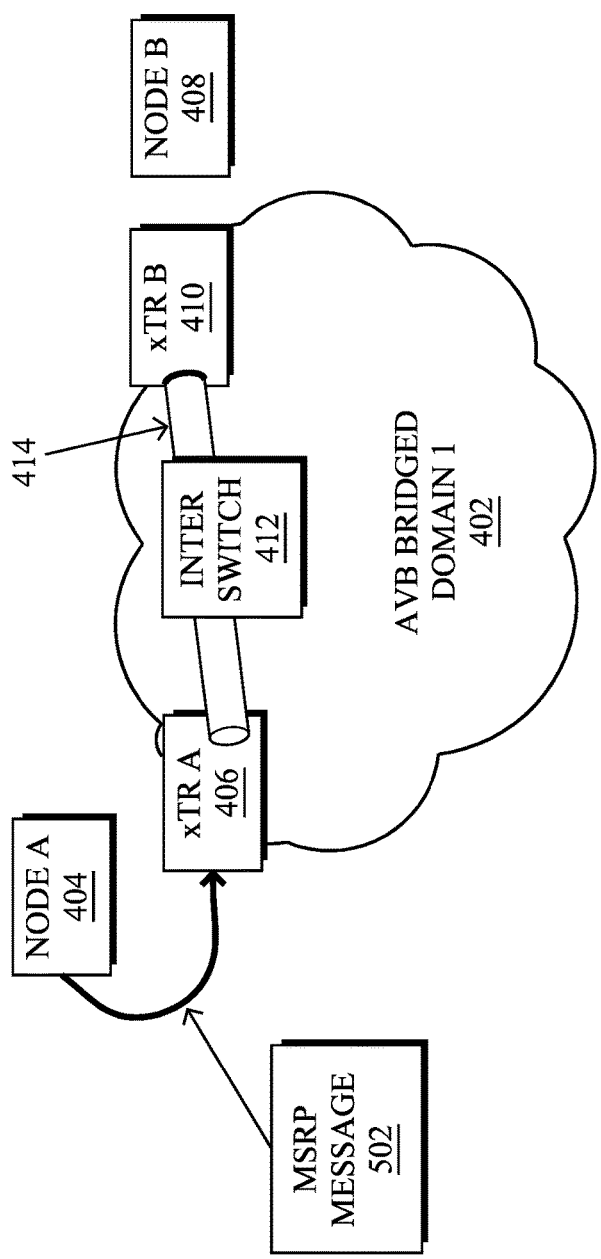
FIG. 5 illustrates an example node that wants to establish a deterministic connection.

Turning to FIG. 5, in an example 500, the first node 404 may want to establish a deterministic connection (e.g., AVB, TSN, etc.) with the second node 408. According to the illustrative AVB standard as will be understood by those skilled in the art, the first node 404 can send a Multiple Stream Reservation Protocol (MSRP) stream along the AVB (or TSN) bridged domain 402. The first tunnel router 406 can intercept an MSRP message 502 (or any other reservation request) sent by the first node 404 (e.g., in a fashion similar to Multiple Listener Discovery (MLD) proxy). The first tunnel router 406 can determine a deterministic path being constructed by the first node 404, where a multicast MAC address is assigned to the deterministic path and designed to reach the second node 406. Similarly, the second tunnel router 410 can intercept User to Networking Signaling by the second node 406. The second tunnel router 410 can determine that it is to identify multicast MAC address and serve the second node 406.

The first tunnel router 406 can use content of the MSRP message 502 to determine resources required to be reserved in a L3 network for the deterministic path. In particular, the first tunnel router 406 can be implemented to use any internet service protocol or MSRP to reserve bandwidth in the L3 network. Further, the first tunnel router 406 can account for additional bandwidth needed for tunnel encapsulation, described in greater detail herein below, while making a resource reservation request.

Figure 6:
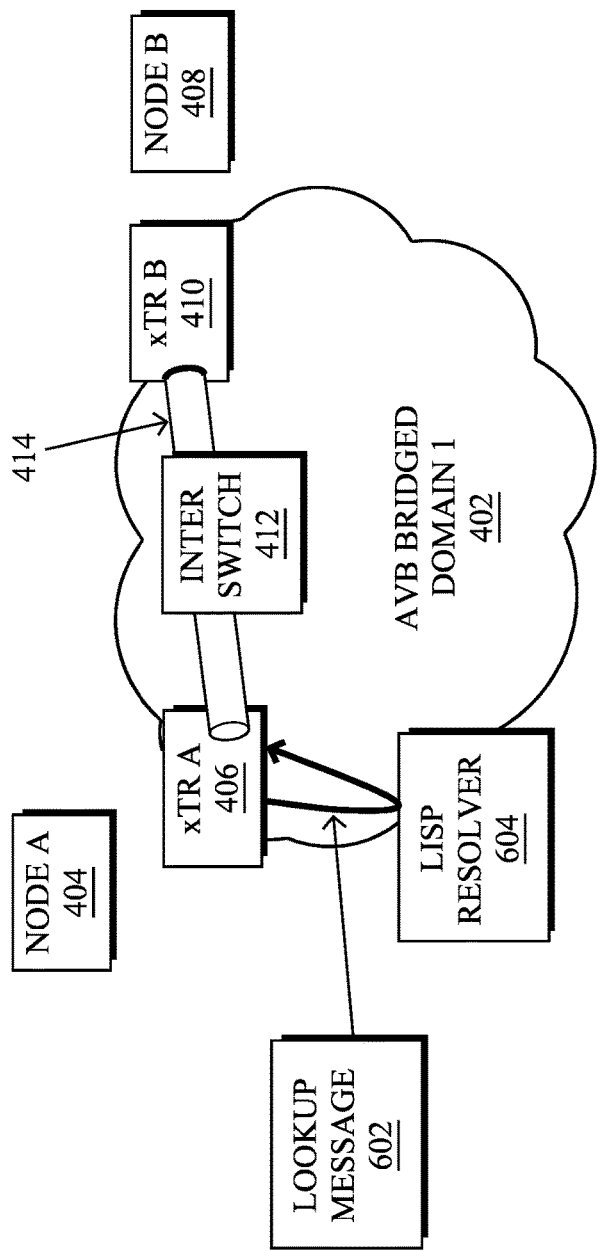
FIG. 6 illustrates an example tunnel router determining a destination media access control (MAC) address.

Turning to FIG. 6, in an example 600, the first tunnel router 406 can determine the destination MAC address of the second node 408 is reached via the second tunnel router 410. In particular, the first tunnel router 406 can make this determination via a control plane protocol, for example, LISP, BGP, etc. As shown in example 600, the first tunnel router 406 may exchange a lookup message 602 with a LISP resolver 604 to determine the destination MAC address of the second node 408.

Figure 7:
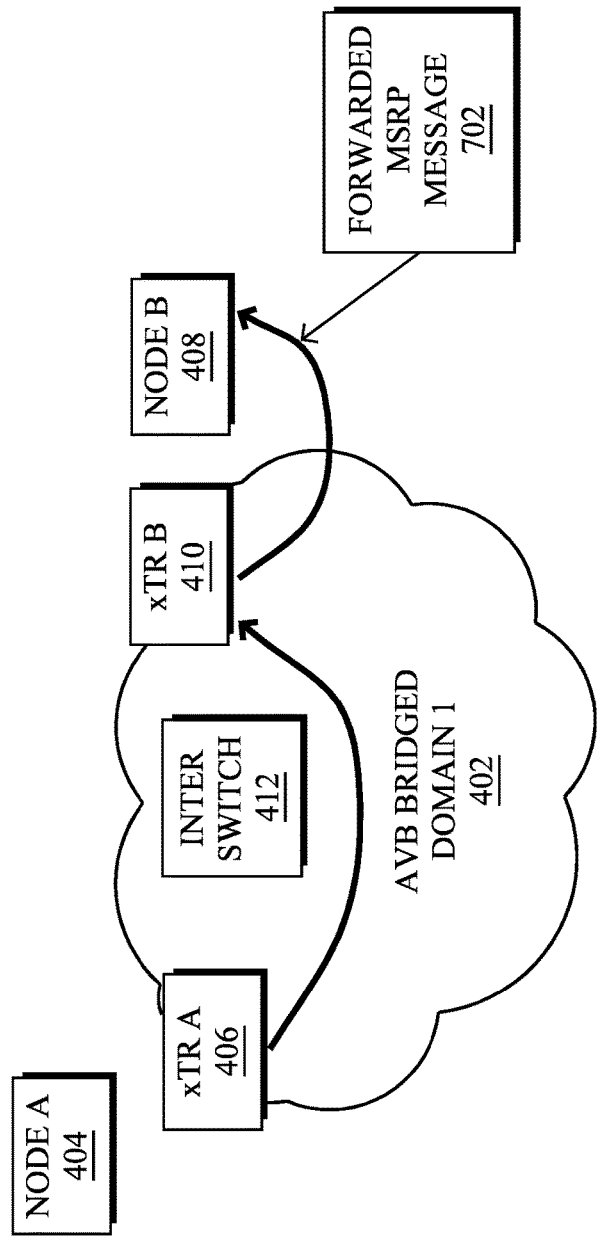
FIG. 7 illustrates an example tunnel router forwarding a Multiple Stream Reservation Protocol (MSRP) message.

As shown in FIG. 7, in an example 700 and in parallel to the first tunnel router determining the destination MAC address of the second node 408, the first tunnel router 406 can forward the MSRP (intercepted from the first node 404). The forwarded MSRP 702 is flooded into the AVB (or TSN) bridged domain 402, where the forwarded MSRP 702 is eventually intercepted by the second tunnel router 410 on behalf of the second node 406. Consequently, the first tunnel router 406 and the second tunnel router 410 have determined the deterministic path between the first node 404 and the second node 408, where the deterministic path is associated with the multicast MAC address. The first tunnel router 406 and the second tunnel router 410 can configure hardware, software, etc. to receive packets for the multicast MAC address (as opposed to forwarding it). Additionally, the first tunnel router 406 and the second tunnel router 410 may exchange messages to establish or pass parameters for establishing or confirming an intent to serve the tunnel 414.

Figure 8:
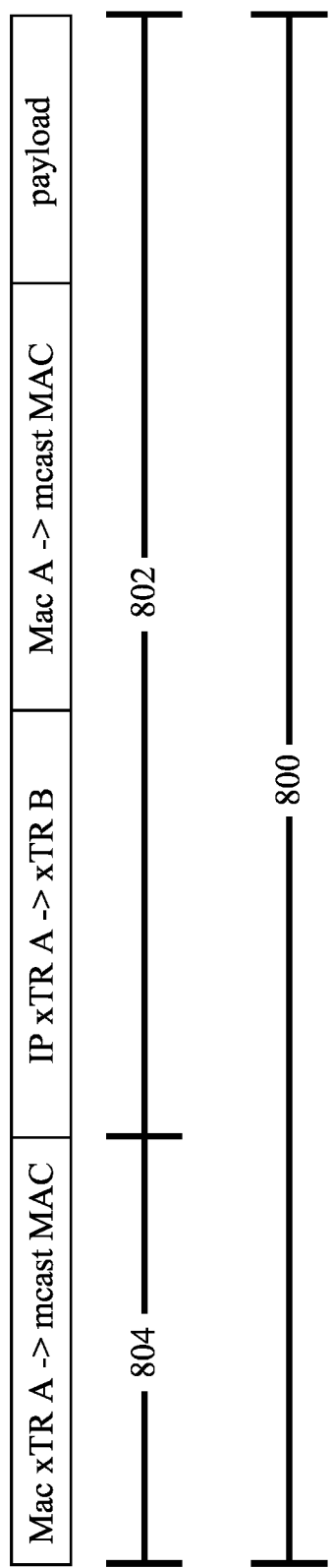
FIG. 8 illustrates an example virtual extensible local area network (VxLAN) tunnel packet.

Subsequently, when the first node 404 sends a deterministic packet for the deterministic path, it sets the multicast address for the deterministic packet as the multicast MAC address. The first tunnel router 406 can intercept the deterministic packet and encapsulate the deterministic packet in, for example, a VxLAN tunnel packet, where an outer MAC address of the VxLAN tunnel packet is the multicast MAC address of the deterministic path. Turning to FIG. 8, an example VxLAN tunnel packet 800 is shown, where the example VxLAN tunnel packet 800 comprises the deterministic packet 802 and a header 804. The header 804 comprises an outer MAC address of the VxLAN tunnel packet that is set to the multicast MAC address of the deterministic path. As a result, for any packet intercepted by the first tunnel router 406 from the first node 404 for the deterministic path, the multicast MAC address (and any other parameter) is the same in the encapsulation for a destination packet and the encapsulated destination packet itself.

Figure 9:
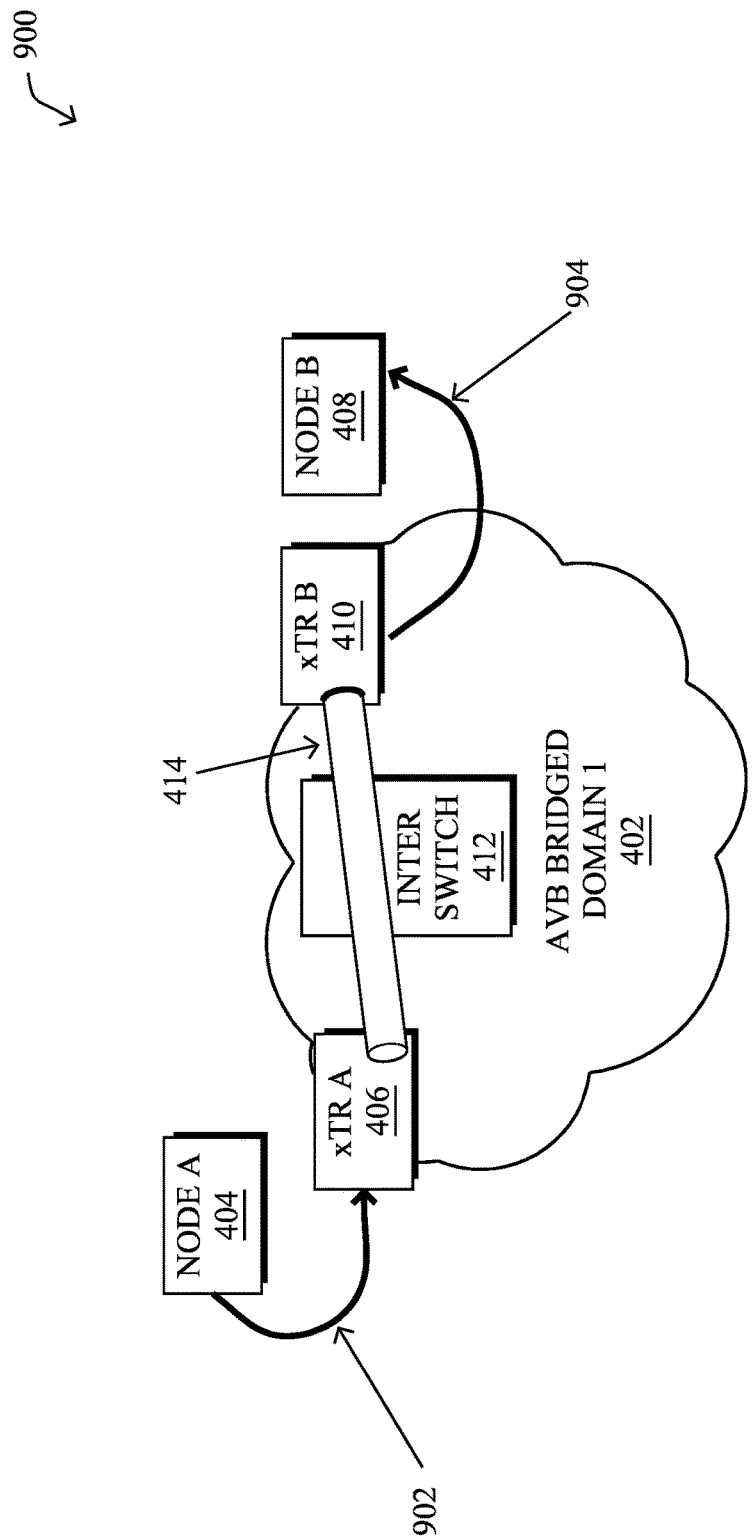
FIG. 9 illustrates example multiple AVB bridged domains.

Turning to FIG. 9, in an example 900, an example flow of deterministic data (or stream) from the first node 404 to the second node 408 via the tunnel 414 is shown. In particular, the first node 404 may send deterministic data packet over a first link 902 to the first tunnel router 406. The first tunnel router 406 may encapsulate the deterministic data packet 902 into a tunnel packet such that the multicast MAC address of the deterministic path (for the deterministic data) is the outer MAC address of the tunnel packet. The tunnel first tunnel router 406 can send the tunnel packet over the tunnel 414 to the second tunnel router 410. The second tunnel router 410 can decapsulate the tunnel packet then send the deterministic data packet to the second note over a second link 904.

According to one or more embodiments described herein, therefore, any one or more of the following may be performed in order to facilitate deterministic forwarding of data from the first node 404 to the second node 408:

1. Copying, by the first tunnel router 406, an inner destination multicast MAC address to an outer destination MAC address of an encapsulated deterministic data frame before forwarding;

2. Copying, by the first tunnel router 406, a 12-bit VLAN ID associated with a Stream VLAN ID to an UDP source port field of an outer header (e.g., VxLAN header or inner tagged for GRE);
3. Enforcing, by nodes along the deterministic path (e.g., the intermediate switches 412), a unicast routing lookup on the received, encapsulated frame even if the destination MAC address is multicast (this may be implemented by executing a router mac lookup override or registering, by every router aware of the MSRP, the Stream MAC address as its router MAC address so that the router can perform a routing lookup upon receiving the encapsulated deterministic packet);
4. Overriding, by nodes along the deterministic path (e.g., the intermediate switches 412), a match of the inner IP address and outer multicast MAC address for MAC-IP multicast address rules;
5. Using the destination MAC address and the UDP source port (with VLAN ID) as a flow specification to match reserved bandwidth (primary code point (PCP) fields can be mapped to the outer IP Differentiated services Code Point (IP/DSCP);
6. Implementing forwarding using Unicast IP routing with link selection based on the outer MAC and a final rewrite including the Stream MAC address as a destination (instead of a next hop gateway MAC);
8. Transporting MSRP signaling over a VxLAN domain so tunnel routers (e.g., the first tunnel router 406, the second tunnel router 410, etc.) can determine streams they represent; and
9. Implementing MSRP signaling for "Talker" advertisements and "Listener" responses can take conventional paths with taking into account bandwidth required due to the additional encapsulation.

—Deterministic Forwarding Across Multiple Layer 3 Domains—

As noted above and shown in FIG. 3, IEEE 802.1 TSN builds deterministic paths across a L2 switch fabric. As described above, DNA networks can encapsulate L2 frames in VxLANs (in IP) and route the encapsulated L2 frames by using a resolver to make the forwarding decision (e.g., a LISP mapping system). Other overlay techniques are also possible, for example, GRE. Tunnel Routers that serve final nodes can encapsulate/decapsulate the VxLAN in order to restore the transported frame and deliver it transparently to end-points. In order to enable determinism in this model, some embodiments of the techniques described above transfer TSN properties to the VxLAN/GRE tunnel encapsulation across the L2 fabric.

One benefit for using L2 in L3 encapsulation is the ability to join different L2 domains and to make the joined L2 domains appears as a single entity to end-points, thereby allowing a cloud or an enterprise network to be distributed across locations. AVB, as the name suggests, is limited to providing a network integrated professional quality audio and video over L2 domains. These distinct L2 domains can be connected via L3 networks that are extended across different administrative domains. An example could be IP TV or telepresence across two branches of the same enterprise separated geographically connected via a WAN link. The present disclosure can be extended to deterministic flows beyond AVB. Generally, a deterministic flow requires: bandwidth reservation, bounded and limited latency, and time synchronization.

The techniques herein may thus additionally be configured to enable segregating deterministic segments that use a different technology, utilizing segment routing to exit the segment, and switching from one technology to another at selected points. The segments may be stitched at forwarding time. In particular, an embodiment can rely on VxLAN to transport reserved flows inside a campus or a cloud site and interconnect multi-domain networks through L3 using DetNet PseudoWires that are bundled as Pseudo Etherchannels. The techniques herein extend deterministic L2 streams across multiple L3 domains, for example, AVB across an L3 network. In some embodiments, the present disclosure discusses only a forwarding plane based on the need for bandwidth reservation, which can be implemented over L3. MPLS traffic engineering (MPLS-TE) of PseudoWire may be suitable for an ISP network but not for enterprise and cloud network.

The techniques of the embodiments described herein may also thus be used when building large semi-permanent deterministic transport tunnels between L2 (private) domains at L3 across an ISP network. Multiple (e.g., more dynamic) end-to-end TSN flows are placed in one transport circuit to traverse an ISP network, which addresses the concern of the aggregated bandwidth for multiple end-to-end circuits and the dynamics of adding/removing flows. This approach need not build a deterministic circuit across an ISP network each time an end-to-end circuit is established.

Figure 10:
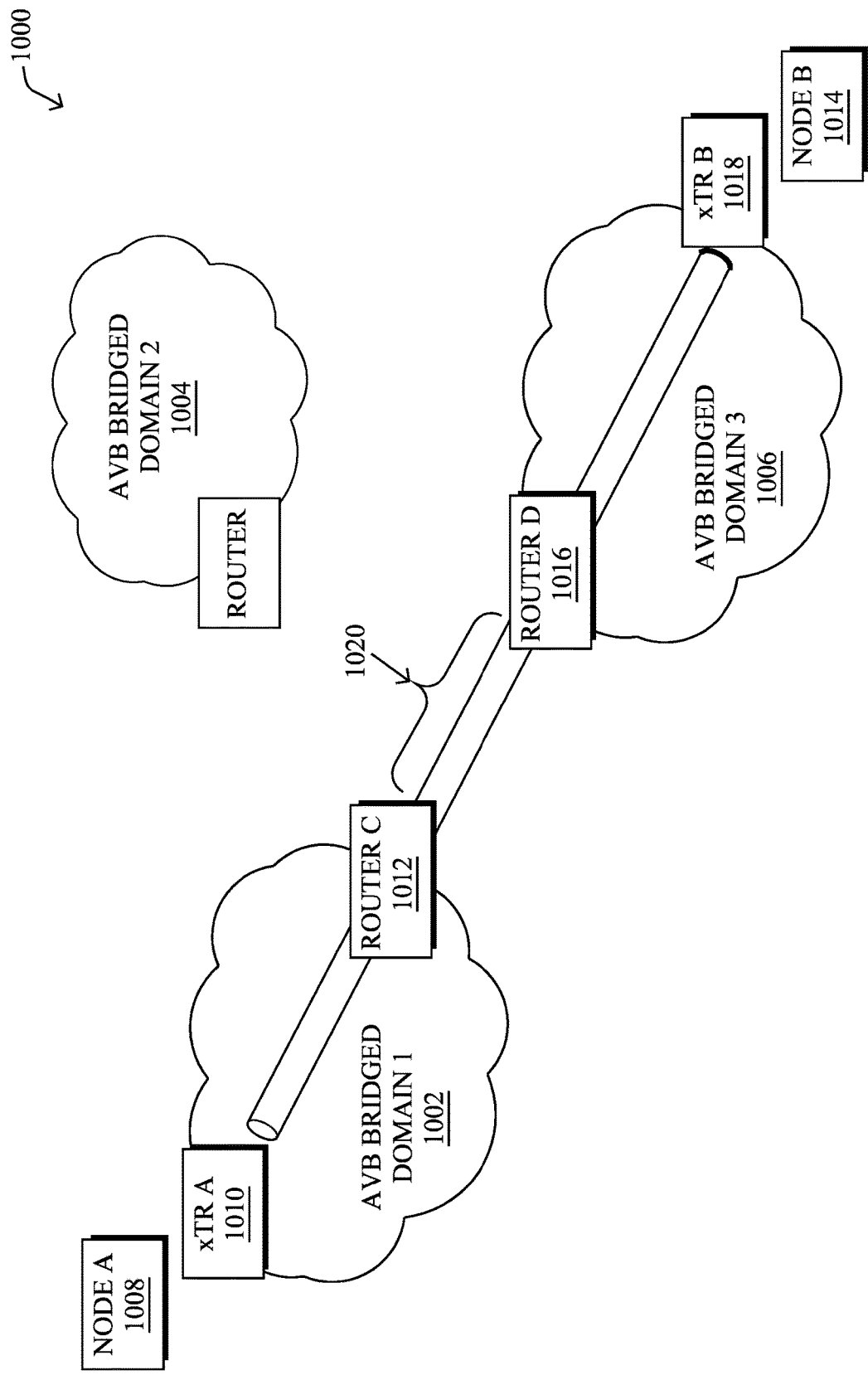
FIG. 10 illustrates example tunnel routers implementing a Relay xTunnelRouter (RxTR) function.

With reference to example 1000 of FIG. 10, an illustrative embodiment of a computer network may comprise a first AVB bridged domain "1" 1002, a second AVB bridged domain "2" 1004, and a third AVB bridged domain "3" 1006. The first AVB bridged domain 1002 comprises a first node "A" 1008, a first (head-end) tunnel router "xTR A" 1010, and a second (intermediate) tunnel router "C" 1012. The third AVB bridged domain 1006 comprises a second node "B" 1014, a third (intermediate) tunnel router "D" 1016, and a fourth (tail-end) tunnel router "xTR B" 1018. Each of the AVB bridged domains form separate L2-AVB networks, and there may be a cross-domain L3 network 1020 that connects the first AVB bridged domain 1002 and the third AVB bridged domain 1006.

In some embodiments of the present disclosure, a new function may be implemented: a Relay xTunnelRouter (RxTR). In the example 1000, the second tunnel router (C) 1012 and the third tunnel router (D) 1016 can perform this function. RxTRs are placed at the edge of contiguous L2 domains and are interconnected using DetNet (e.g., PseudoWires). The Relay xTRs proactively build DetNet tunnels between one another and are large pipes that may encapsulate multiple AVB connections. Additionally, in some embodiments of the present disclosure, the concept of Pseudo-Etherchannel may be implemented, which is based on aggregating PseudoWires using the same logic as physical etherchannel. A Pseudo-Etherchannel enables the RxTRs to increase the bandwidth between them based on actual demand by adding DetNet PseudoWires to the Pseudo-Etherchannel. Conventional Etherchannel operations can be handled on ethernet emulations, which allows an RxTR to increase the bandwidth by allocating more PseudoWires in a Pseudo-Etherchannel.

Further, traditional methods of defragmentation and release used to manage memory heaps or path computation element (PCE) reservations can be implemented in the example 1000. Notably, machine learning may be used to determine an optimum size of the DetNet pipes that form the Pseudo-Etherchannel.

Figure 11:
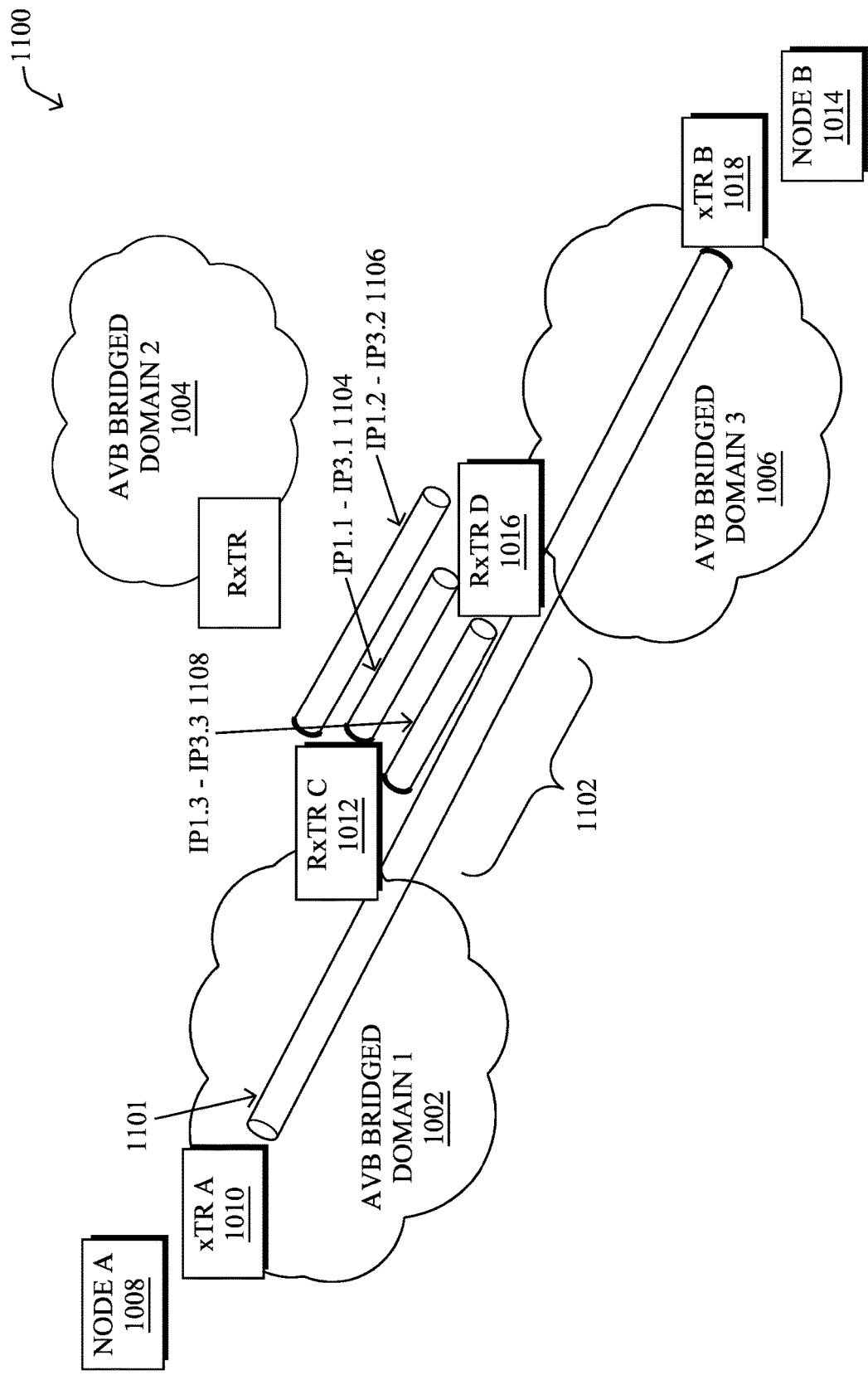
FIG. 11 illustrates an example node attempting to establish an AVB connection with a second node across domains.

Turning to FIG. 11, in an example 1100, the first node 1008 may attempt to establish an AVB connection 1101 with the second node 1014. In the example 1100, a deterministic path (of connection 1101) from the first node (A) 1008 to the second tunnel router (Router C, now "RxTR C") 1012 belongs to the first AVB bridged domain 1002. The rest of the deterministic path from the third tunnel router (Router D, or now "RxTR D") 1016 to the second tunnel node (B) 1014 belongs to the third AVB bridged domain 1006. As an illustrative example, assume that a Pseudo-Etherchannel 1102 can also be formed of three DetNet PseudoWires: a first Detnet PseudoWire 1104 (from IP address IP1.1 to IP3.1), a second DetNet PseudoWire 1106 (from IP address IP1.2 to IP3.2), and a third DetNet PseudoWire 1108 (from IP address IP1.3 to IP3.3).

Figure 12:
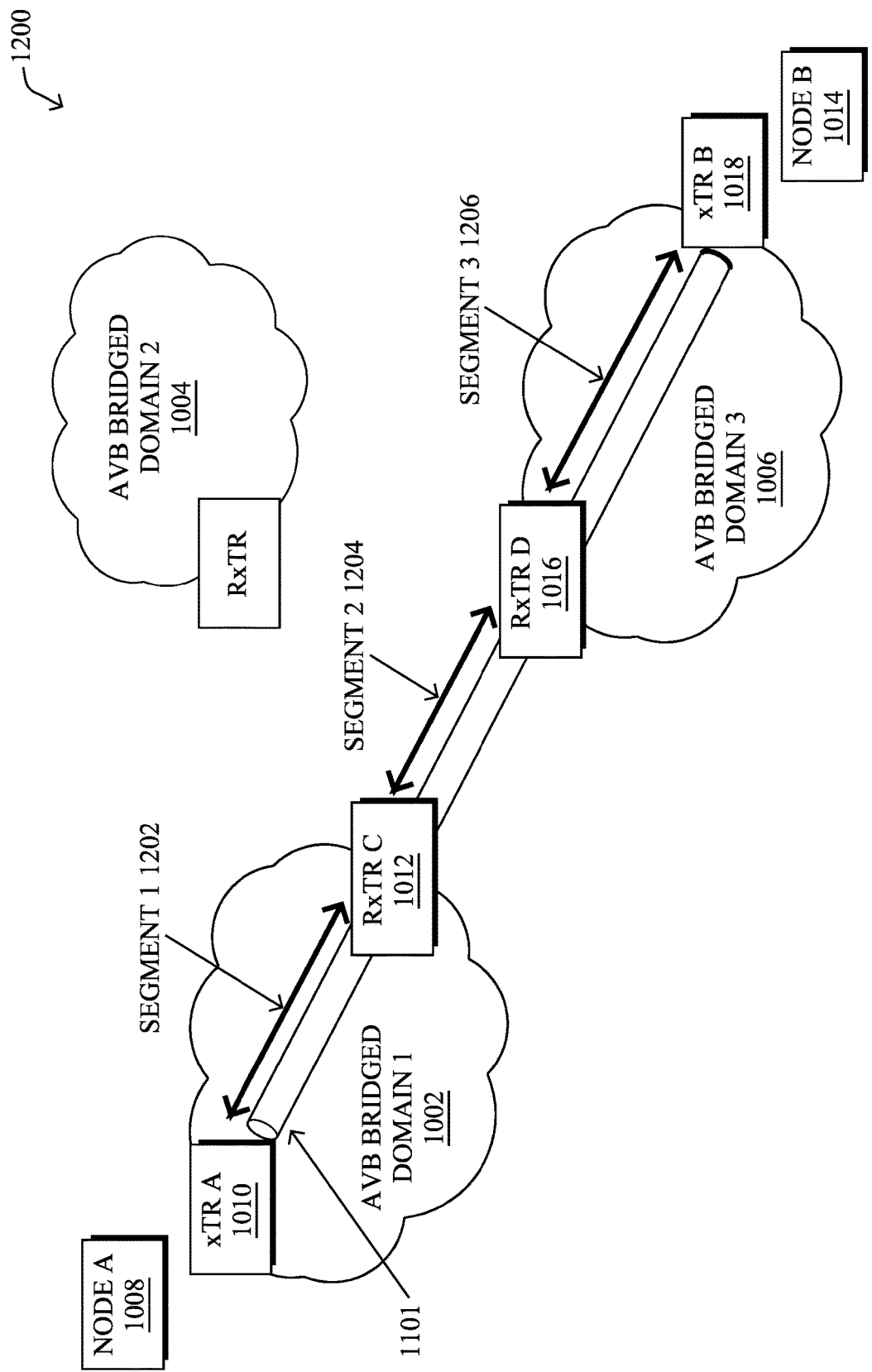
FIG. 12 illustrates example segments in multiple AVB bridged domains.

In some embodiments, the Pseudo-Etherchannel 1102 is traversed as a segment in an end-to-end segmented route via, in order, the first tunnel router 1010, the second tunnel router 1012 (a first RxTR), the third tunnel router 1016 (a second RxTR), and the fourth tunnel router 1018. Due to segment routing, nodes in between the segment need to be aware of the deterministic transfer along the segment but are unaware of the segment routing itself. As shown in FIG. 12, in an example 1200, there may be a first segment 1202, a second segment 1204, and a third segment 1206.

Figure 13:
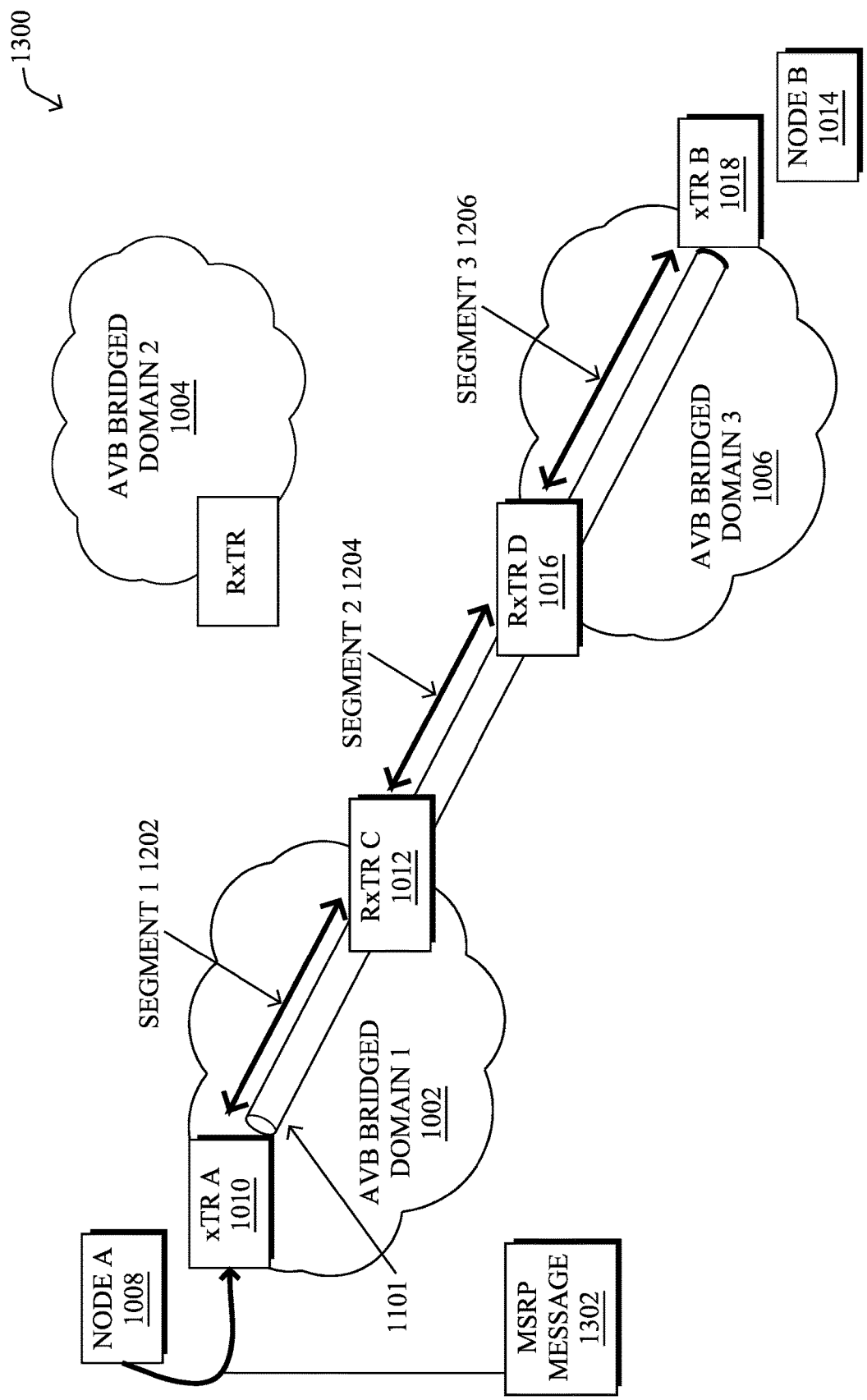
FIG. 13 illustrates an example of resource reservation in multiple AVB bridged domains.

With reference to FIG. 13, in the example 1300, resource reservation in an L2 domain (e.g., the first AVB bridged domain 1002, the third AVB bridged domain 1006, etc.) may be implemented using the techniques described above. In particular, the first tunnel router 1010 may intercept an MSRP packet 1302 (or reservation request) from the first node 1008 to determine a new deterministic path for a multicast MAC address.

Figure 14:
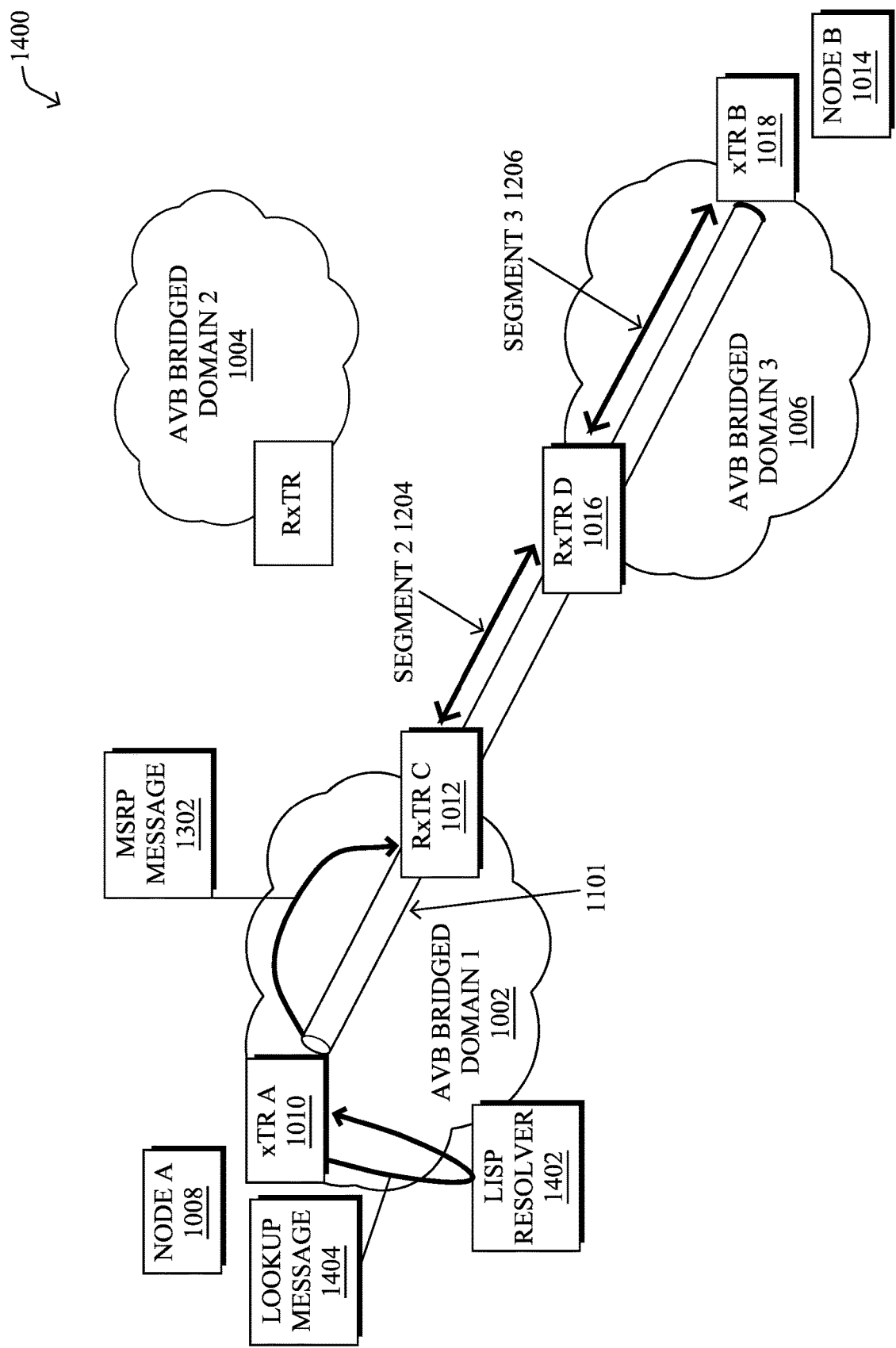
FIG. 14 illustrates an example Location Identifier Separation Protocol (LISP) resolver in multiple AVB bridged domains.

However, in contrast to the techniques described above and in order to provide for resource reservation from a source (e.g., the first node 1008) to a destination (e.g., the second node 1014) that are separated via multiple domains, a LISP resolver can return a sequence of nodes that represents the segments (e.g., the first segment 1202, the second segment 1204, and the third segment 1206). FIG. 14 shows an example 1400 of a LISP resolver 1402 returning a lookup message 1404 that include information indicating the sequence of nodes that represent the deterministic path from the first node 1008 to the second node 1014. RxTRs can proxy the role of a tunnel router in their domain on behalf of the tunnel router on their side.

For example, the third tunnel router 1016 will emulate the fourth tunnel router 1018 over the PseudoWire for the second tunnel router 1012, acting as listener for the MSRP flow that the fourth tunnel router 1018 is listening to. Additionally, in the example, the second tunnel router 1012 will emulate the first tunnel router 1010 in the relation with the fourth tunnel router 1018 as described in the techniques above. Further, the second tunnel router decapsulates VxLAN traffic. However, rather than the second tunnel router 1012 delivering it to the end-point, it will route the decapsulated VLAN traffic over the DetNet PseudoWire 1102. In order to do so, the VLAN traffic is stitched into existing Pseudo-Etherchannel reservations that are proactively placed. If there is not enough bandwidth, then a new DetNet reservation takes place over the IP/DetNet segment (e.g., the second segment 1204) to add a DetNet PseudoWire to the Pseudo-Etherchannel.

Figure 15:
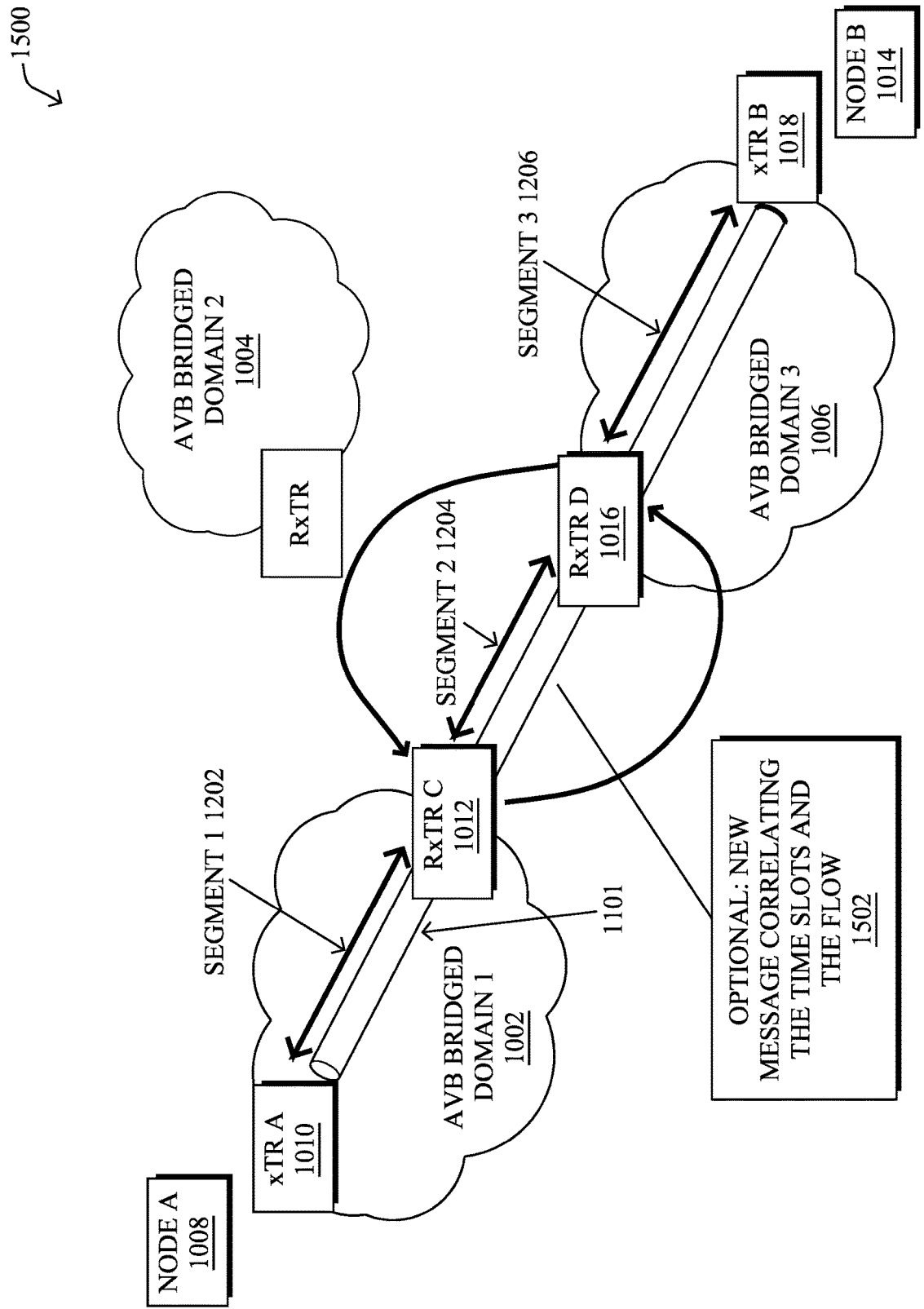
FIG. 15 illustrates example RxTRs exchanging a flow.

In some embodiments, shown in FIG. 15 in example 1500, the RxTRs (e.g., the second tunnel router 1012 and the third tunnel router 1016) exchange a new flow 1502 to indicate which time slots of the Pseudo-Etherchannel are used for the flow, as identified by its multicast MAC address. The flow also instructs the third tunnel router 1016 of the remainder of the segments, so third tunnel router 1016 can continue the same process.

Figure 16:
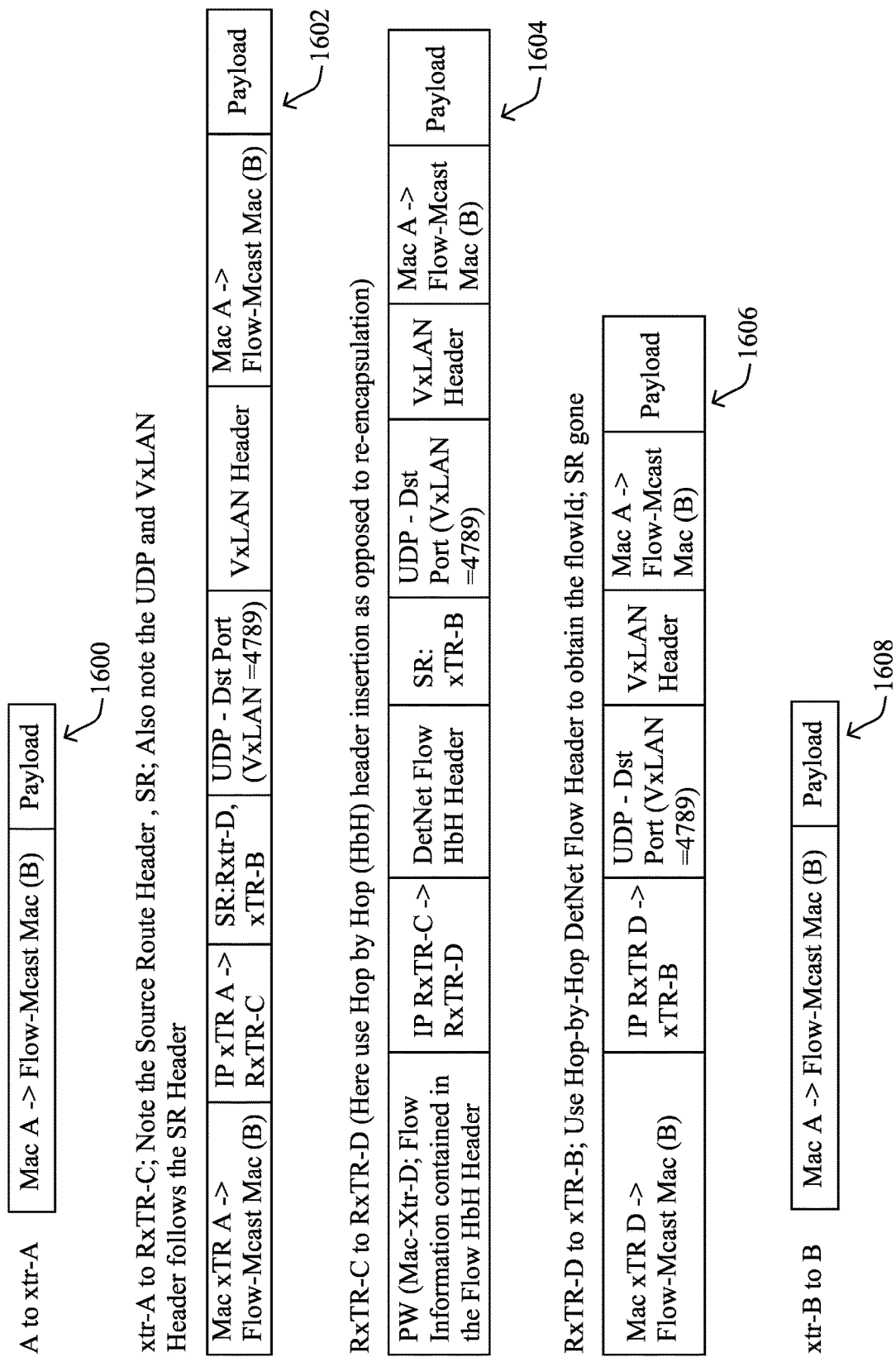
FIG. 16 illustrates example frame formats for multiple AVB bridged domains.

In comparison to the techniques described in more detail above, the IP layer of the VxLAN includes a Segment Routing Header indicating the segments of different nature. As shown in FIG. 16, additional frame formats may result. In particular, the following are shown:

1. A first format 1600 of a first packet from the first node 1008 to the first tunnel router 1010 (A to xTR-A);
2. A second format 1602 of a packet from the first tunnel router 1010 to the second tunnel router 1012 (xTR-A to RxTR-C);
3. A third format 1604 of a packet from the second tunnel router 1012 to the third tunnel router is shown 1016 (RxTR-C to RxTR-D);
4. A fourth format 1606 of a packet from the third tunnel router 1016 to the fourth tunnel router 1018 (RxTR-D to xTR-B); and
5. A fifth format 1608 of a fifth packet from the fourth tunnel router 1018 to the second node 1014 (xTR-B to B).

As shown in FIG. 16, the flow uses the same multicast MAC in both domains. The RxTRs (e.g., the second tunnel router 1012 and the third tunnel router 1016) execute a proxy operation for the flows that are on the other sides of their tunnels. An alternative, if this scalability issues arise, would be to have two separate flow IDs (e.g., multicast MAC addresses): one in the first AVB bridged domain 1002 for the deterministic path from the first node 1008 to the second tunnel router 1012 and a second in the third AVB bridged domain 1006 for the deterministic path from the third tunnel router 1016 to the second node 1014 (e.g., the end of the flow).

The techniques herein thus also provide enhancements to control plane resource reservation protocols in order to provide a L2/L3 independent resource reservation mechanism between two deterministic network end-points. The techniques herein also introduce capabilities such as accumulated latency into different reservation models, primarily in a control plane, and data plane capabilities can be extended across multiple-domains. Furthermore, L3 networks connecting the domains need not be an overlay and carry end-to-end deterministic flow information.

Figure 17:
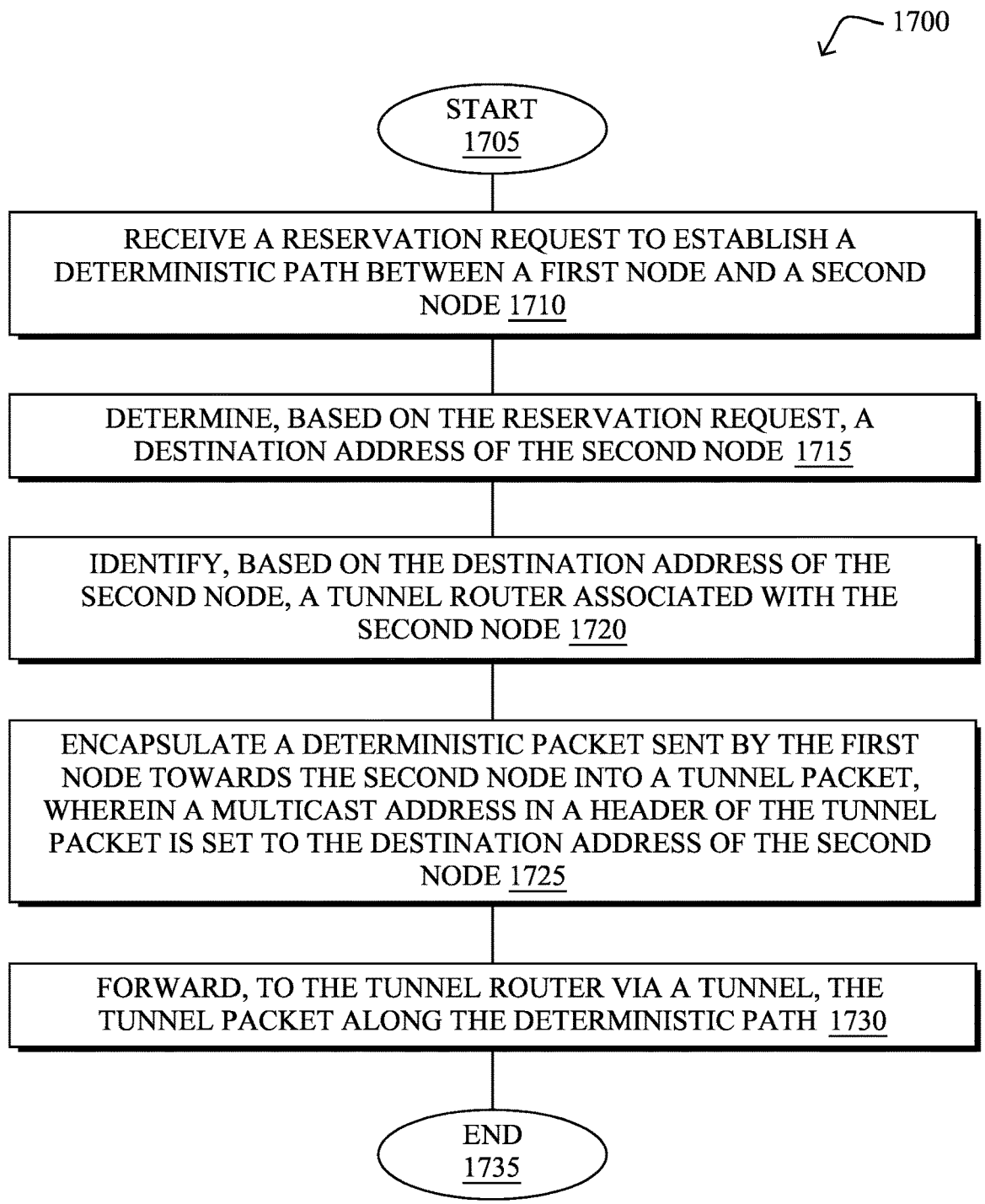
FIG. 17 illustrates an example simplified procedure for deterministic forwarding across layer-2 (L2) and layer-3 (L3) networks.

In closing, FIG. 17 illustrates an example simplified procedure for deterministic forwarding across L2 and L3 networks in accordance with one or more embodiments described herein. For example, a non-generic, specifically configured device (e.g., device 200) may perform procedure 1700 by executing stored instructions (e.g., process 248).

The procedure 1700 may start at step 1705, and continues to step 1710, where, as described in greater detail above, a first tunnel router (e.g., the device, such as xTR A) may receive a reservation request to establish a deterministic path (e.g., AVB, TSN, etc.) between a first node and a second node (e.g., an MSRP request between nodes A and B above). At step 1715, the first tunnel router may determine, based on the reservation request, a destination address of the second node. For example, as described above, this may be based on determining the destination address of the second node via a control plane protocol, such as LISP, BGP, and so on. Note that according to the techniques herein, the "destination address" of the second node may comprise the multicast-address as in the inner packet according to certain embodiments described above, or else may comprise a mapped MAC-address for crossing domains according to certain other embodiments described above. Other possible destination addresses may also be used in alternative embodiments, such as when applying the techniques to protocols other than the example protocols illustrated herein.

At step 1720, the tunnel router may then identify, based on the destination address of the second node, a second tunnel router (e.g., xTR B) associated with the second node. At step 1725, the tunnel router may then encapsulate a deterministic packet sent by the first node towards the second node into a tunnel packet, wherein a multicast address in a header of the tunnel packet is set to the destination address of the second node (e.g., a MAC address). Accordingly, at step 1730, the tunnel router may then forward the tunnel packet along the deterministic path to the tunnel router via a tunnel (e.g., GRE, VxLAN, etc.), such that the multicast address in the header of the tunnel packet causes nodes between the first tunnel router and the second tunnel router to send the tunnel packet according to the deterministic path.

Note that in one embodiment as described above, the nodes between the first tunnel router and the second tunnel router may comprise a relay tunnel router located at an edge of an L2 domain, e.g., connecting distinct L2 domains via an L3 network. For instance, in these embodiments as described in greater detail above, the tunnel may traverse a plurality of routing segments (e.g., and may alternate between different technologies/protocols), and one or more nodes along the tunnel between the first tunnel router and the second tunnel router are aware of the deterministic path but are unaware of the of routing segments.

The simplified procedure 1700 may then end at step 1735. It should be noted that while certain steps within procedure 1700 may be optional as described above, the steps shown in FIG. 17 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, facilitate extending AVB or TSN domains across L3 networks using various types of tunneled networks, while ensuring stream information (even if in L2) is not lost due to encapsulation/decapsulation that is implemented for a tunnel underlay. Absent these techniques, deterministic networking across L3 networks would be a challenge. In particular, the techniques herein describe tunnel routers (as opposed to end nodes) performing TSN or AVB reservation, where a stream DA from a stream data packet (sent by an end node) is used as a destination MAC address in an outer tunnel frame. Doing so ensures that routers (between a sending node and a receiving node) forward the tunnel packet based on the IP, while still facilitating resource reservation matching based on the outer stream MAC. Accordingly, deterministic paths can be preserved across an L2 and L3 network.

While there have been shown and described illustrative embodiments that provide for deterministic forwarding across L2 and L3 networks, it is to be understood that various other adaptations and modifications may be made within the spirit and scope of the embodiments herein. For example, while certain embodiments are described herein with respect to using certain protocols and related terminology (e.g., AVB, TSN, etc.), the techniques herein are not limited as such and, other suitable protocols, technologies, and so on may be used herein, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disk, CD, RAM, EEPROM, etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, at a first relay tunnel router, a reservation request to establish a deterministic path between a first node and a second node, wherein the first node and the second node are in different layer-2 (L2) domains;
receiving, at the first relay tunnel router and from a location identifier separation protocol (LISP) resolver, a sequence of network segments comprising the deterministic path, wherein one of the network segments aggregates a plurality of pseudowires between the first relay tunnel router and a second relay tunnel router located in a different L2 domain;
receiving, at the first relay tunnel router, virtual extensible local area network (VxLAN) traffic with a segment routing header that indicates at least two of the network segments of the sequence of network segments;
inserting, at the first relay tunnel router, a hop by hop Deterministic Networking (DetNet) flow header into the VxLAN traffic, wherein the hop by hop DetNet flow header indicates a flow identifier; and
sending, at the first relay tunnel router, the VxLAN traffic to the second relay tunnel router with the hop by hop DetNet flow header.

2. The method as in claim 1, where one of the network segments of indicated by the segment routing header is based on IEEE 802.1 Time Sensitive Networking (TSN) and another of the network segments is based on audio video bridging (AVB).

3. The method as in claim 1, wherein receiving, by the first relay tunnel router, the reservation request to establish the deterministic path comprises:
intercepting, by the first relay tunnel router, a multiple stream reservation protocol (MSRP) request.

4. The method as in claim 1, further comprising:
determining, by the first relay tunnel router, that the plurality of pseudowires between the first relay tunnel router and the second relay tunnel router does not provide sufficient bandwidth; and
causing, by the first relay tunnel router, formation of additional pseudowires between the first relay tunnel router and the second relay tunnel router.

5. The method of claim 1, wherein the flow identifier comprises a multicast media access control (MAC) address.

6. The method of claim 1, wherein the second relay tunnel router, after receiving the VxLAN traffic with the hop by hop DetNet flow header, obtains the flow identifier based on the hop by hop DetNet flow header.

7. The method of claim 6, wherein the second relay tunnel router removes the hop by hop DetNet flow header from the VxLAN traffic and inserts the flow identifier into the VxLAN traffic.

8. An apparatus, comprising:
one or more network interfaces to communicate with a network;

a processor coupled to the network interfaces and configured to execute one or more processes; and a memory configured to store a process executable by the processor, the process when executed operable to:

receive a reservation request to establish a deterministic path between a first node and a second node, wherein the first node and the second node are in different layer-2 (L2) domains;

receive, from a location identifier separation protocol (LISP) resolver, a sequence of network segments comprising the deterministic path, wherein one of the network segments aggregates a plurality of pseudowires between a first relay tunnel router and a second relay tunnel router located in a different L2 domain;

receive virtual extensible local area network (VxLAN) traffic with a segment routing header that indicates at least two of the network segments of the sequence of network segments;

insert a hop by hop Deterministic Networking (DetNet) flow header into the VxLAN traffic, wherein the hop by hop DetNet flow header indicates a flow identifier; and send the VxLAN traffic to the second relay tunnel router with the hop by hop DetNet flow header.

9. The apparatus of claim 8, where one of the network segments of indicated by the segment routing header is based on IEEE 802.1 Time Sensitive Networking (TSN) and another of the network segments is based on audio video bridging (AVB).

10. The apparatus of claim 8, wherein to receive the reservation request to establish the deterministic path comprises:

intercepting a multiple stream reservation protocol (MSRP) request.

11. The apparatus of claim 8, wherein the flow identifier comprises a multicast media access control (MAC) address.

12. The apparatus of claim 8, wherein the process when executed is further configured to:

determine that the plurality of pseudowires between the first relay tunnel router and the second relay tunnel router does not provide sufficient bandwidth; and cause formation of additional pseudowires between the first relay tunnel router and the second relay tunnel router.

13. The apparatus of claim 8, wherein the second relay tunnel router, after receiving the VxLAN traffic with the hop by hop DetNet flow header, obtains the flow identifier based on the hop by hop DetNet flow header.

14. The apparatus of claim 13, wherein the second relay tunnel router removes the hop by hop DetNet flow header from the VxLAN traffic and inserts the flow identifier into the VxLAN traffic.

15. A tangible, non-transitory, computer-readable medium storing program instructions that cause a device in a network to execute a process comprising:

receiving, at a first relay tunnel router, a reservation request to establish a deterministic path between a first node and a second node, wherein the first node and the second node are in different layer-2 (L2) domains;

receiving, at the first relay tunnel router and from a location identifier separation protocol (LISP) resolver, a sequence of network segments comprising the deterministic path, wherein one of the network segments aggregates a plurality of pseudowires between the first relay tunnel router and a second relay tunnel router located in a different L2 domain;

receiving, at the first relay tunnel router, virtual extensible local area network (VxLAN) traffic with a segment routing header that indicates at least two of the network segments of the sequence of network segments;

inserting, at the first relay tunnel router, a hop by hop Deterministic Networking (DetNet) flow header into the VxLAN traffic, wherein the hop by hop DetNet flow header indicates a flow identifier; and sending, at the first relay tunnel router, the VxLAN traffic to the second relay tunnel router with the hop by hop DetNet flow header.

16. The computer-readable medium as in claim 15, where one of the network segments of indicated by the segment routing header is based on IEEE 802.1 Time Sensitive Networking (TSN) and another of the network segments is based on audio video bridging (AVB).

17. The computer-readable medium as in claim 15, wherein receiving, by the first relay tunnel router, the reservation request to establish the deterministic path comprises:

intercepting, by the first relay tunnel router, a multiple stream reservation protocol (MSRP) request.

18. The computer-readable medium as in claim 15, wherein the flow identifier comprises a multicast media access control (MAC) address.

19. The computer-readable medium as in claim 15, wherein the second relay tunnel router, after receiving the VxLAN traffic with the hop by hop DetNet flow header, obtains the flow identifier based on the hop by hop DetNet flow header.

20. The computer-readable medium as in claim 19, wherein the second relay tunnel router removes the hop by hop DetNet flow header from the VxLAN traffic and inserts the flow identifier into the VxLAN traffic.

* * * * *